(12) United States Patent
Gu

(10) Patent No.: US 11,068,692 B2
(45) Date of Patent: Jul. 20, 2021

(54) IMAGE CAPTURING DEVICE UNDER SCREEN AND ELECTRONIC EQUIPMENT

(71) Applicant: SHANGHAI HARVEST INTELLIGENCE TECHNOLOGY CO., LTD, Shanghai (CN)

(72) Inventor: Fengjun Gu, Shanghai (CN)

(*) Notice: Subject to any disclaimer, the term of this patent is extended or adjusted under 35 U.S.C. 154(b) by 0 days.

(21) Appl. No.: 16/709,924

(22) Filed: Dec. 11, 2019

(65) Prior Publication Data
US 2020/0193122 A1 Jun. 18, 2020

(30) Foreign Application Priority Data
Dec. 12, 2018 (CN) .......................... 201811518506.6

(51) Int. Cl.
*G06K 9/00* (2006.01)
*G06K 9/20* (2006.01)

(52) U.S. Cl.
CPC ......... *G06K 9/0004* (2013.01); *G06K 9/2027* (2013.01); *G06K 9/0008* (2013.01)

(58) Field of Classification Search
CPC ... G06K 9/0004; G06K 9/2027; G06K 9/0008
See application file for complete search history.

(56) References Cited

U.S. PATENT DOCUMENTS 10,474,867 B2 * 11/2019 Yeke Yazdandoost ...................... H01L 51/5281
2017/0017824 A1 * 1/2017 Smith .................... G02B 6/005
2017/0220844 A1 * 8/2017 Jones .................... G06F 3/0421
2017/0337412 A1 * 11/2017 Bhat .................... G06K 9/0004
2018/0012069 A1 * 1/2018 Chung ................. G06K 9/2036
2018/0196985 A1 * 7/2018 Ling ................... H01L 27/3246
2018/0357460 A1 * 12/2018 Smith ................ H01L 27/3227
2019/0026522 A1 * 1/2019 Wang ........................ G02F 1/29
2019/0026523 A1 * 1/2019 Shen .................. H01L 51/5281
2019/0311176 A1 * 10/2019 Haddad .............. G06K 9/00046
2020/0097696 A1 * 3/2020 Yao ...................... G06K 9/0004
2020/0097699 A1 * 3/2020 Zeng .................. G06K 9/00013

* cited by examiner

*Primary Examiner* — Utpal D Shah

(57) ABSTRACT

The image capturing device under the screen and the electronic equipment including a nonopaque cover plate, a light source module, and a photosensor module are provided. The nonopaque cover plate, the light source module, and the photosensor module are sequentially arranged from top to bottom. The nonopaque cover plate is provided with nonopaque area, the light source module includes a plurality of light sources arranged in an array, the photosensor module comprises a plurality of discrete photosensors. The light emitted from each light source toward the nonopaque area is reflected by the nonopaque cover plate and received by one photosensor in the photosensor module. By the above-mentioned scheme, the biometric information on the nonopaque area that is outside the projection range of the photoelectric sensor can also be obtained by the photosensors, effectively increasing the imaging area of the photosensors, effectively reducing the area of the photosensors required to detect the same image information, preventing from occupying too much space under the screen, and saving hardware costs.

9 Claims, 3 Drawing Sheets

IMAGE CAPTURING DEVICE UNDER SCREEN AND ELECTRONIC EQUIPMENT

FIELD OF THE DISCLOSURE

The invention relates to the technical field of imaging under a screen, and in particular, to an image capturing device under a screen and an electronic equipment.

BACKGROUND OF THE INVENTION

With the development of information technology, biometric recognition technology is playing an increasingly important role in ensuring information security. Fingerprint recognition has become one of the key technical means for identity recognition and device unlocking widely used in the mobile Internet field. With the increasing screen ratio of devices, traditional capacitive fingerprint recognition is no longer sufficient. Ultrasound fingerprint recognition has problems such as technical maturity and cost. Optical fingerprint recognition is expected to become the mainstream technical solution for fingerprint recognition under the screen.

The current optical fingerprint recognition solution is based on the principles of geometric optics about lens imaging. The current fingerprint module includes microlens array, optical spacial filter and other components, and has many disadvantages such as complex structure, thick module, small photosensitive range and high cost. The total reflection imaging by using the principle of physical optics to realize the optical fingerprint recognition under the screen without lens has the advantages of simple structure, thin module, large photosensitive range and low cost compared with the existing optical fingerprint solutions. The imaging area of the current optical imaging under the screen is generally smaller than the photosensitive area, so in order to obtain a larger imaging area, a larger sensor needs to be disposed under the screen, occupying the space under the screen.

SUMMARY OF THE INVENTION

Therefore, it is necessary to provide an image capturing device under a screen, so that the disadvantage of prior art occupying the space under the screen due to requiring a larger imaging area under the screen to dispose a larger sensor can be resloved.

In order to achieve the above object, an image capturing device under a screen including a nonopaque cover plate, a light source module, and a photosensor module is provided. The nonopaque cover plate, the light source module, the photosensor module are sequentially arranged from top to bottom. The nonopaque cover plate is provided with nonopaque area, the light source module includes a plurality of light sources arranged in an array, the photosensor module includes a plurality of discrete photosensors, the light emitted from each light source toward the nonopaque area is reflected by the nonopaque cover plate and received by one photosensor in the photosensor module.

In some embodiment, the plurality of discrete photosensors are respectively located directly below the plurality of light sources arranged in the array.

In some embodiment, the light received by the photosensor includes the light emitted from at least one of the plurality of light sources, directed to the nonopaque area, totally reflected by the nonopaque cover plate and entering the photosensor, a gap between adjacent photosensors of the plurality of discrete photosensors is smaller than a propagation distance of the totally reflected light in a direction parallel to a surface of the nonopaque cover plate.

In some embodiment, the light source module includes a first light source, the photosensor module includes a second sensor, and there is not a normal line of the nonopaque cover plate passing through the first light source and the second sensor simultaneously. The light emitted by the first light source toward the nonopaque area is totally reflected to the second sensor by the nonopaque cover plate.

In some embodiment, the light source module further includes a third light source, the first light source and the third light source are lit according to a preset time sequence, and there is not a normal line of the nonopaque cover plate passing through the third light source and the second sensor simultaneously. Light emitted from the third light source toward the nonopaque area is totally reflected to the second sensor by the nonopaque cover plate.

In some embodiment, the photosensor module includes a first photosensor. A normal line of the nonopaque cover plate passes through the first sensor and the first light source, and another normal line of the nonopaque cover plate passes through the first sensor and the third light source.

In some embodiment, the light source module further includes a second light source, a normal line of the nonopaque cover plate passes through the second sensor and the second light source, light emitted from the second light source toward the nonopaque area is totally reflected to the first sensor by the nonopaque cover plate.

In some embodiment, the light source module further includes a fourth light source, a normal line of the nonopaque cover plate passes through the second sensor and the fourth light source, light emitted from the fourth light source toward the nonopaque area is totally reflected to the first sensor by the nonopaque cover plate. The second light source and the fourth light source are lit according to a preset time sequence.

In some embodiment, the plurality of discrete photosensors are respectively located directly below gaps between adjacent light sources of the plurality of light sources arranged in the array.

In some embodiment, the light source module includes a display panel, and the display panel is a liquid crystal display, an active matrix organic light emitting diode display, or a micro light emitting diode display. The plurality of light sources are a plurality of display pixels on the display panel.

An electronic equipment is provided. The electronic equipment includes a processor and an image capturing device connected to the processor. The image capturing device is the above-mentioned image capturing device under the screen.

Compared to the prior art, the image capturing device under the screen and the electronic equipment in the above-mentioned technical scheme include a nonopaque cover plate, a light source module, and a photosensor module. The nonopaque cover plate, the light source module, the photosensor module are sequentially arranged from top to bottom, the nonopaque cover plate is provided with nonopaque area, the light source module includes a plurality of light sources arranged in an array, the photosensor module comprises a plurality of discrete photosensors, the light emitted from each light source toward the nonopaque area is reflected by the nonopaque cover plate and received by one photosensor in the photosensor module. By the above-mentioned scheme, the biometric information on the nonopaque area that is outside the projection range of the photoelectric sensor can also be obtained by the photosensors, effectively increasing the imaging area of the photosensors, effectively reducing the area of the photosensors required to detect the same image information, preventing the photosensors from occupying too much space under the screen, and saving hardware costs.

DESCRIPTION OF THE PREFERRED EMBODIMENTS

Technical contents, structural features, implemented objectives and effects of the present invention will be described in detail below in combination with embodiments and with reference to the accompanying drawings.

Figure 1:
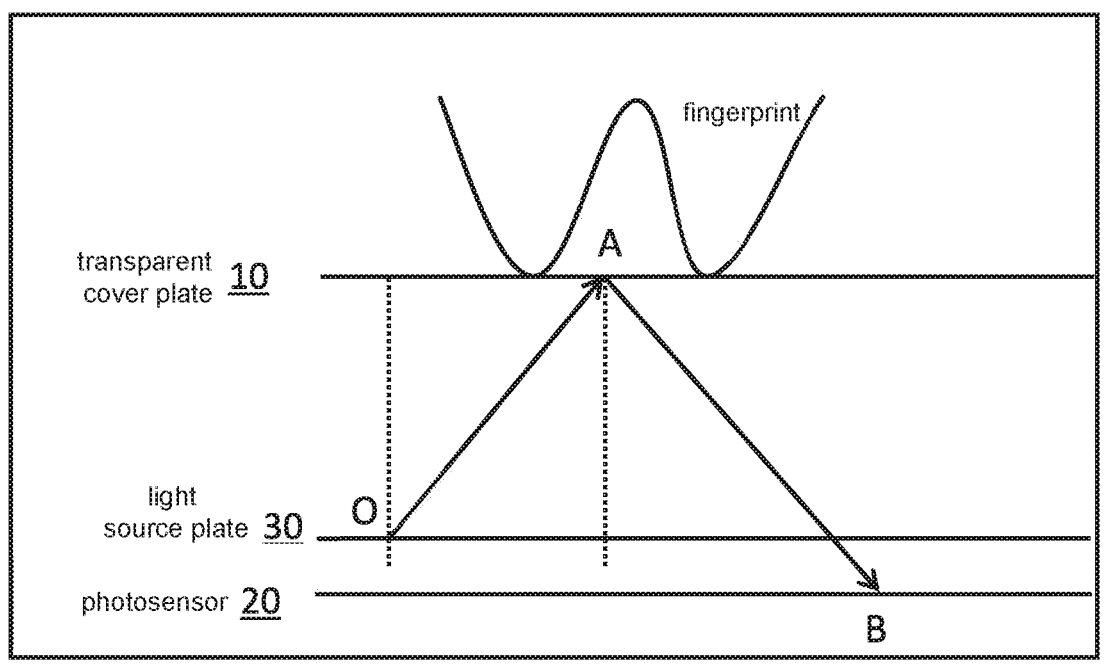
FIG. 1 is a schematic diagram of realizing optical fingerprint imaging under the screen without lens based on total reflection.

Please refer to FIG. 1 which is a schematic diagram of realizing optical fingerprint imaging under the screen without lens based on total reflection. The image capturing device under the screen includes a nonopaque cover plate 10, a light source plate 30, and photosensors 20. The nonopaque cover plate 10, the light source plate 30, and the photosensors 20 are placed from top to bottom. The light source plate 30 is provided with a plurality of light sources. After the light emitted by the light source is totally reflected by the nonopaque cover plate 10, the reflected light is received by the photosensor 20. By capturing the reflected light, the photosensors 20 can restore a biometric image (such as fingerprint information) currently located on the nonopaque cover plate 10.

The principle of total reflection imaging is as follows. When the user's finger is in contact with the light-transmissive cover 10, air exists in the recess of the fingerprint, so the incident light emitted from the light source enters the medium of a lower refractive index (i.e. air) from the medium of a higher refractive index (i.e glass) on the surface of the nonopaque cover plate 10. The reflected light is captured by the photosensor 20 disposed below the light source plate 30. At this time, the photosensor 20 captures light that has been totally reflected by the nonopaque cover plate 10, so the captured light will be brighter. When the contact position of the incident light emitted from the light source with the nonopaque cover plate 10 is just the convex part of the fingerprint, the incident light enters the medium of higher refractive index (ie, the human finger) on the surface of the nonopaque cover plate 10 from the medium of lower refractive index (ie, glass), the incident angle of the incident light does not exceed the critical angle of total reflection, so that the total reflection phenomenon does not occur on the surface of the nonopaque cover plate 10. That is, part of the incident light is lost due to refraction on the surface of the nonopaque cover plate 10, so the reflected light collected by the photosensor 20 is relatively dark. By the bright and dark reflected light received by the photosensor, the fingerprint image information of the current user can be restored.

As shown in FIG. 1, when a user's finger presses a point A on a cover glass (nonopaque cover plate 10), light emitted by the light source on the light source plate 30 is totally reflected when being incident on the top surface of the nonopaque cover plate 10. The reflected light is reflected to point B on the surface of the photosensor 20, and a fingerprint image at position A can be obtained based on the light data captured by the photosensor 20 at point B.

In some embodiment, the nonopaque cover plate 10, the light source plate 30 and the photosensor 20 are arranged in parallel to each other. The light source plate 30 may be a panel provided with at least one light source. The nonopaque cover plate 10 may be a plate having single layer or multiple layers. The single layer plate may be a glass cover plate or a cover plate made of organic nonopaque material, or a cover plate having functions besides nonopaque property, such as be a cover plate made of glass and/or organic nonopaque material. In some embodiments, the nonopaque cover plate may further include a touch screen.

The photosensor 20 is configured to obtain a light emitted from the light source and reflected by the surface of the nonopaque cover plate 10. The photosensor 20 includes a plurality of photosensitive units. The photosensor 20 may be separately disposed below the light source plate 30 or disposed on the light source plate 30. When the photosensor 20 is disposed below the light source plate 30, light can enter the photosensor 20 through a gap between the light sources on the light source plate 30. When the photosensor 20 is disposed on the light source plate 30, the photosensitive unit may be disposed in a gap between each light source (such as a display pixel) of the light source plate 30. Of course, when other physiological parts of the user (such as the palm) are placed on the nonopaque cover plate 10, based on similar principles, the photosensor 20 can also be used to capture image information of these physiological parts.

In some embodiment, the space between the nonopaque cover plate 10 and the light source plate 30 can be filled by optical glue, so as to prevent air from the reflected light. The refractive index of the filled optical glue should be close to the refractive index of the nonopaque cover plate 10 to avoid total reflection between the optical glue and the light-transmitting cover plate 10.

Figure 2:
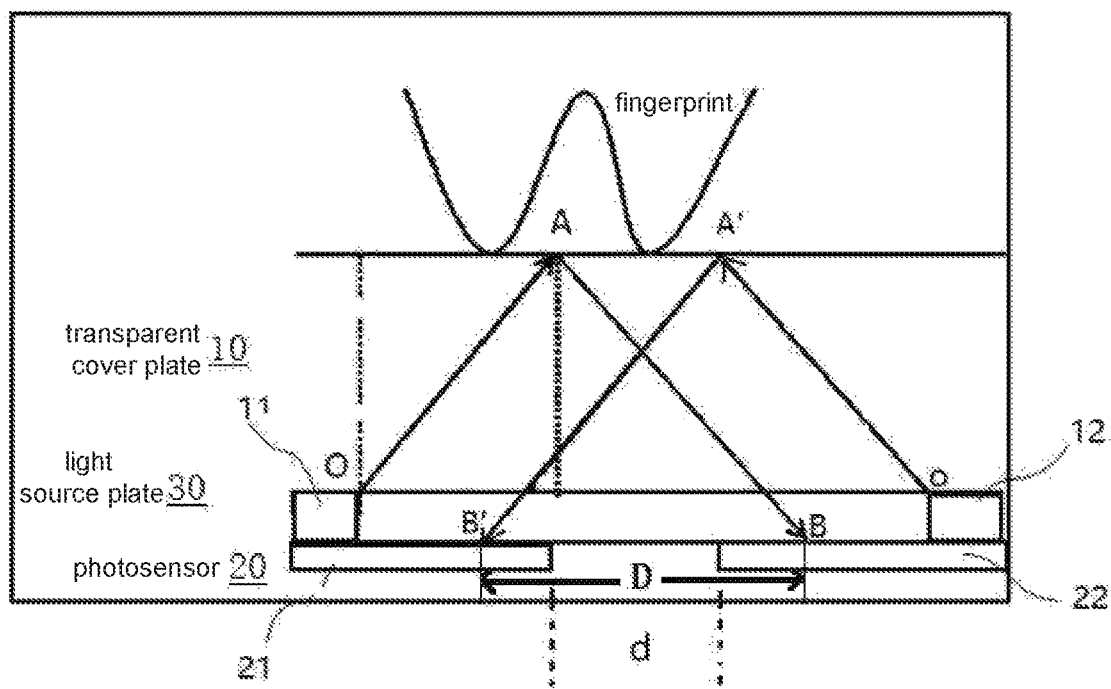
FIG. 2 is a schematic diagram of imaging of an image capturing device under a screen according to an embodiment of the present invention.

As shown in FIG. 2, it is a schematic diagram of imaging of an image capturing device under a screen according to an embodiment of the present invention. The image capturing device under a screen includes a nonopaque cover plate 10, a light source plate 30, and a photosensor 20, the light source includes a first light source 11, and the photosensor 20 includes a second sensor 22. The nonopaque cover plate 10, the light source plate 30, and the photoelectric sensor 20 are sequentially arranged from top to bottom. The first light source 11 and the second sensor 22 are separated from each other by a predetermined length in a direction parallel to the surface of the nonopaque cover plate 10. The nonopaque cover plate 10 has a nonopaque area beyond the edge of the first light source 11. The light emitted from the first light source 11 toward the nonopaque area is totally reflected into the second sensor 22 by the nonopaque cover plate 10.

In the embodiment, when obtaining a fingerprint image beyond the vertical edge of the first light source 11, by disposing the second sensor 22 not directly below the first light source 11, the position of the photoelectric sensor 20 that receives the reflected light from the current light source can exceed the vertical projection range of the light source. That is, the range of reflected light that the photoelectric sensor can receive is larger than the size range of the light source, thereby expanding the range of optical fingerprint imaging of a single photosensor 20. Thus, the arrangement of the second sensor 22 in the embodiment can also save the needed space below the first light source 11. For example, a first sensor 21 is disposed below the first light source 11, and the first sensor 21 is configured to receive reflected light that is totally reflected by other light sources through the nonopaque cover plate 10, so that the space under the light source plate 30 is used reasonably.

Of course, the size of the nonopaque cover plate 10 is not limited, and the size of the nonopaque cover plate 10 only needs to satisfy the existence of an area beyond the edge of the first light source 11. In some embodiments, the size of the light source plate 30 is smaller than that of the nonopaque cover plate 10, that is, the nonopaque area is located outside the projection range of the first light source 11 on the surface of the nonopaque cover plate 10.

In order to better obtain the fingerprint image, in some embodiment, please refer to FIG. 2. The image capturing device under the screen of the present disclosure further includes a first sensor 21. There is an overlapping area between the first sensor 21 and the first light source 11 in a direction parallel to the surface of the nonopaque cover plate 10. For example, the first sensor 21 is disposed directly below the first light source 11 in the vertical direction. In some embodiment, the light emitted from the second light source 12 toward the nonopaque area is totally reflected into the first sensor 21 by the nonopaque cover plate 10. In other words, in some cases, the first sensor 21 receives the reflected light from the second light source 12 that is not in the same vertical direction. The second light source 12 and the first light source 11 is such as located on the same light source plate 30 or independently disposed. The first light source 11 and the second light source 12 are such as light-emitting pixels or light-emitting particles under the display panel. Through the above-mentioned solution, the nonopaque area between the different light sources can be imaged by the photosensors 20 that are not on the same vertical plane, thereby achieving the effect of further improving the imaging in a wide range.

In the embodiment shown in FIG. 2, the first sensor 21, the second sensor 22, and other sensors not shown in the figure form an array of sensors. The first sensor 21 and the second sensor 22 in the array also have the following feature: there is a gap d between the first sensor 21 and the second sensor 22. By designing the gap, the space in the layer where the photosensor 20 is located is further optimized. The photosensors need not be arranged in a dense manner, thereby saving hardware costs and improving the utilization of the internal space.

In some embodiment of obtaining fingerprint image, When the user places his finger on the nonopaque cover plate 10, the texture of the user's fingerprint is pressed at the middle position above the nonopaque cover plate 10. As shown in FIG. 2, since the position of the user's fingerprint, which is referred as a nonopaque area, is beyond the range of the first light source 11 and the second light source 12 in the horizontal direction. The image information between two adjacent A and A' in the nonopaque area is necessary to be obtained. An incident light OA from the edge of the first light source 11 has collected the first texture information and reflected it to the point B of the second sensor 22 to form an optical path OAB. An incident light O'A' from the edge of the second light source 12 has obtained the second texture information and reflected it to the point B' of the first sensor 21 to form an optical path O'A'B'. The distance between points B and B' in FIG. 2 is D. In order to obtain all information on the nonopaque area, both A and A' need to meet the conditions of coincidence or almost coincidence. Then the size of D is the propagation distance of the reflected light after a total reflection on the nonopaque cover plate and the light source plate 30. If the thickness of the light source plate 30 is negligible or there is a vacuum between the first light source 11 and the second light source 12 in the light source plate 30, the size of D is the total length of the reflected light projecting on the surface of the nonopaque cover plate 10 in the horizontal direction.

Of course, when the incident angle of total reflection is extremely large, theoretically there is no upper limit for the distance D. Thus, what is discussed here is the minimum case, that is, the reflected light has the incident angle at which total reflection has just occurred. Moreover, the larger the incident angle is, the stronger the attenuation is. We only need to consider the case where D is the minimum total reflection distance. Then, the design distance d of the first sensor 21 and the second sensor 22 only needs to be smaller than the above-mentioned distance D, and the first sensor 21 and the second sensor 22 can obtain all fingerprint images on the nonopaque area. By designing the gap between the first sensor 21 and the second sensor 22 in the above-mentioned solution, the material of sensor in the d-width space is saved, and the cost is further saved.

Figure 3:
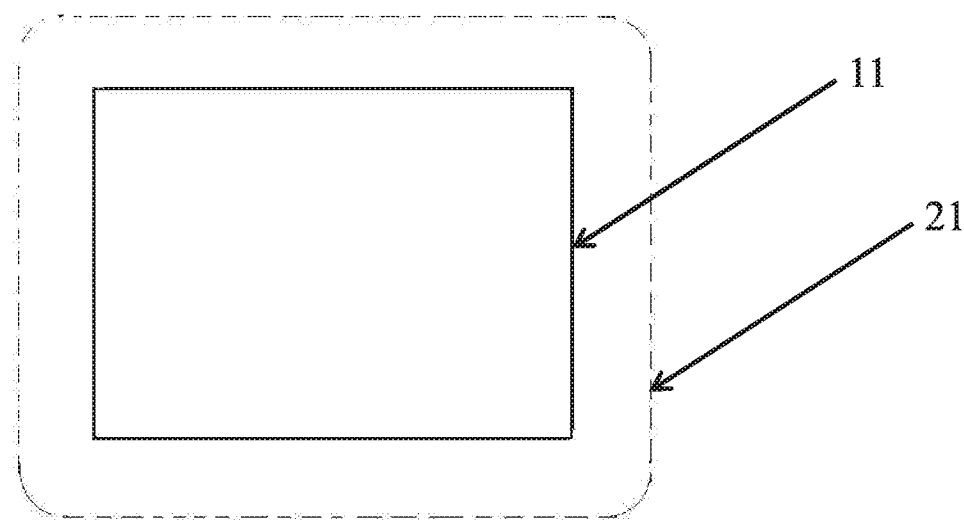
FIG. 3 is a top view of a photosensor and a light source according to an embodiment of the present invention.

From FIG. 2, the first sensor is longer than the first light source 11 in the horizontal direction. Therefore, in the embodiment shown in FIG. 3, we can further design a fingerprint obtaining unit under a screen, which includes an upper light source and a lower sensor. The projection of the sensor in any horizontal direction is longer than the light source. The sensor is designed to surround the light source in the horizontal direction. This obtaining unit can be designed in any shape. The quadrilateral is taken as an example in the figure. The advantage of the quadrilateral is that it can be easily spliced. Of course, it can also be designed as a hexagon, a circle, etc., as long as there is a gap between the sensors of adjacent obtaining units.

An electronic equipment including a processor and an image capturing device connected to the processor is provided in the present disclosue. The image capturing device is the above-mentioned image capturing device under the screen. After driving the light source board 30 by the processor, the photosensor 20 of the electronic equipment can obtain the signal of the reflected light that is totally reflected by the nonopaque cover plate 10 and generate corresponding image information according to the signal of the reflected light. Compared with the prior art where a large-area photosensitive unit is provided below the light source plate 30, the present disclosure only requires a smaller photosensor size, reducing the volume occupied by the photosensors below the light source plate 30 and more space for existing electronic equipment in design. These freeing spaces can be used to place other devices, such as batteries, extending the life of electronic equipment.

Figure 4:
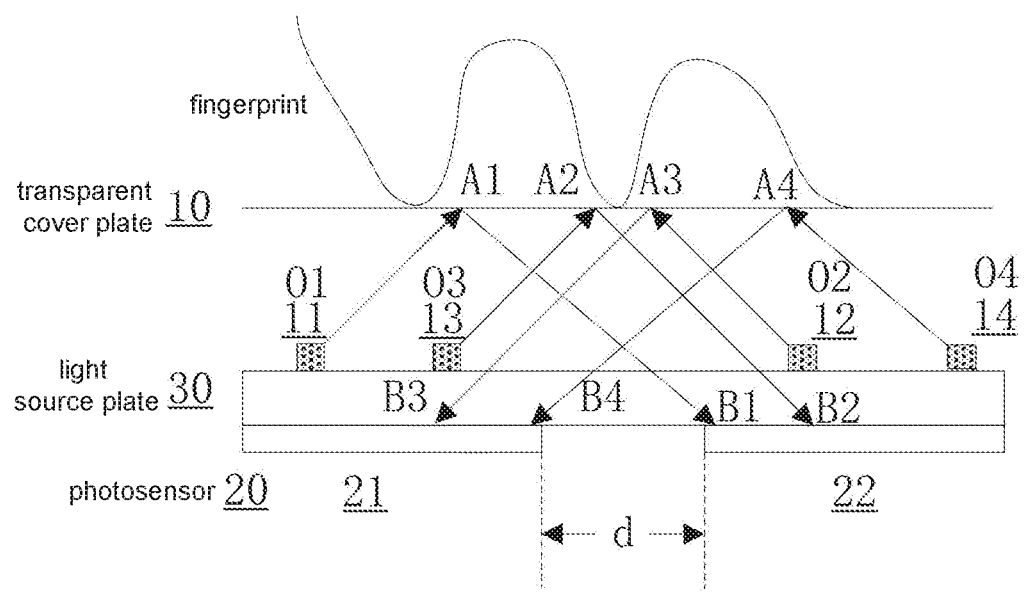
FIG. 4 is a schematic diagram of imaging of an image capturing device under a screen according to another embodiment of the present invention.

As shown in FIG. 4, another image acquisition structure under the screen is also provided in the present disclosure. The image capturing device includes a nonopaque cover plate 10, a light source module, and a photosensor (or photosensor module) 20. The nonopaque cover plate 10, the light source module, and the photosensor 20 are sequentially arranged from top to bottom. The nonopaque cover plate 10 is provided with a nonopaque area. The photosensor 20 includes a second sensor 22. The light source includes a first light source 11 and a third light source 13. The first light source 11 and the third light source 13 are placed on the same light source board 30. The first light source 11 and the third light source 13 are lit according to a preset time sequence. There is not a normal line of the nonopaque cover plate 10 passing through the first light source 11 and the second sensor 22, respectively. Similarly, There is not a normal line of the nonopaque cover plate 10 passing through the third light source 13 and the second sensor 22, respectively. The light emitted by the first light source 11 or the third light source 13 toward the nonopaque area is totally reflected to the second sensor 22 by the nonopaque cover plate 10.

The embodiment shown in FIG. 4 is different from the embodiment shown in FIG. 2 in that there are a plurality of light sources emitting incident light. The first light source 11 is O1 and the third light source 13 is O3 in FIG. 4. The incident light emitted by the light source O1 is totally reflected at the point A1 on the nonopaque cover plate 10, and the reflected light is received by the second sensor 22 disposed below the light source plate 30. The incident point of the reflected light on the second sensor is B1. Then this light can be recorded as O1A1B1. The incident light emitted by the light source O3 is totally reflected at the point A2 on the nonopaque cover plate 10, and the reflected light is received by the second sensor 22 disposed below the light source plate 30. The incident point of the reflected light on the second sensor is B2. Then this light can be recorded as O2A2B2. When a user's finger is placed on the nonopaque cover plate 10, since the contact surface with the nonopaque cover plate 10 is much larger than the area of a single light source, the light source (such as a display pixel) below the contact surface will be lit up at a preset time sequence, to obtain all fingerprint information on the contact surface. The preset time sequence is a light-emitting timing that is set in advance, and may be, for example, from left to right and from top to bottom, but in some special embodiments, other sequences may also be used. By controlling the light sources O1 and O3 to emit light sequentially, the fingerprint information of the nonopaque areas A1 to A2 on the nonopaque cover plate 10 is obtained.

In some embodiments, the image capturing device shown in FIG. 4 further includes the first sensor 2. One normal line of the nonopaque cover plate 10 is passing through the first sensor 21 and the first light source 11, and another normal line of the nonopaque cover plate 10 is passing through the first sensor 21 and the third light source 13. The first sensor 21 is configured to receive incident light emitted from another light source at another position and reflected by the nonopaque cover plate 10, so as to obtain fingerprint information of other corresponding positions on the nonopaque cover plate 10. Since the first sensor is disposed directly below the first light source 11 and the third light source 13, ensuring that the space below is fully and reasonably utilized.

In some embodiments, the image capturing device shown in FIG. 4 further includes a second light source 12, and one normal line of the nonopaque cover plate 10 is passing through the second sensor 22 and the second light source 12. The light emitted from the second light source 12 toward the nonopaque area is totally reflected to the first sensor 21 by the nonopaque cover plate 10. In FIG. 4, the second light source 12 is represented by O2. The first sensor is configured to receive reflected light emitted from O2 and the second sensor is configured to receive reflected light emitted from O1. There are two normal lines passing through the first sensor 21 and O1 and O3, respectively. There are also two normal lines passing through the second sensor 22 and O2 and O4, respectively. In this way, the light emitted by the light sources O1 and O3 above the first sensor 21 is reflected by the nonopaque cover plate 10 and received by the second sensor. The light emitted by the light sources O2 and O4 above the second sensor is reflected by the nonopaque cover plate 10 and received by the first sensor. Since adjacent sensors can mutually receive the reflected light corresponding to the incident light emitted by the light sources above each other, the arrangement area under the light source plate 30 is minimized and the space utilization rate is improved.

In some embodiments, the image capturing device shown in FIG. 4 further includes a fourth light source 14, and one normal line of the nonopaque cover plate 10 is passing through the second sensor 22 and the fourth light source 14. The light emitted from the fourth light source 14 toward the nonopaque area is totally reflected into the first sensor 21 by the nonopaque cover plate 10. The second light source 12 and the fourth light source 14 are lit according to a preset time sequence. The second light source 12 is O2 and the fourth light source 14 is O4 in FIG. 4. The incident light emitted by the light source O2 is totally reflected at the point A3 on the nonopaque cover plate 10, and the reflected light is received by the first sensor 21 disposed below the light source plate 30. The incident point of the reflected light on the first sensor is B3. Then this light can be recorded as O2A3B3. The incident light emitted by the light source O4 is totally reflected at the point A4 on the nonopaque cover plate 10, and the reflected light is received by the first sensor 21 disposed below the light source plate 30. The incident point of the reflected light on the first sensor is B4. Then this light can be recorded as O4A4B4. When a user's finger is placed on the nonopaque cover plate 10, since the contact surface with the nonopaque cover plate 10 is much larger than the area of a single light source, the light source (such as a display pixel) below the contact surface will be lit up at a preset time sequence, to obtain all fingerprint information on the contact surface. The preset time sequence is a light-emitting timing that is set in advance, and may be, for example, from left to right and from top to bottom, but in some special embodiments, other sequences may also be used. By controlling the light sources O2 and O4 to emit light sequentially, the fingerprint information of the nonopaque areas A3 to A4 on the nonopaque is cover plate 10 is obtained.

In some embodiments, when A3 and A4 in FIG. 4 are close enough, the third light source 13 and the second light source 12 are lit according to a preset time sequence. In other words, In FIG. 4, the light sources O1, O3, O2, and O4 are lit according to the time sequence, thereby the fingerprint image from A1 to A4 is obtained.

In some embodiments, a gap is provided between the first sensor and the second sensor. In addition, the gap is smaller than a propagation distance of the totally reflected light in a direction parallel to the surface of the nonopaque cover plate 10. The related description of setting the gap and the gap size has been described in detail in the foregoing and will not be repeated again.

In some embodiments, the light source plate 30 is a display panel, and the display panel is a liquid crystal display, an active matrix organic light emitting diode display, or a micro light emitting diode display. The light sources are display pixels on the display panel. In short, the display pixel on the display panel is used as the light source in the present disclosure. The light emitted by the display pixel is used as incident light. The incident light is reflected by the nonopaque cover plate 10 and received by the corresponding photosensor 20 below the light source plate 30.

Figure 5:
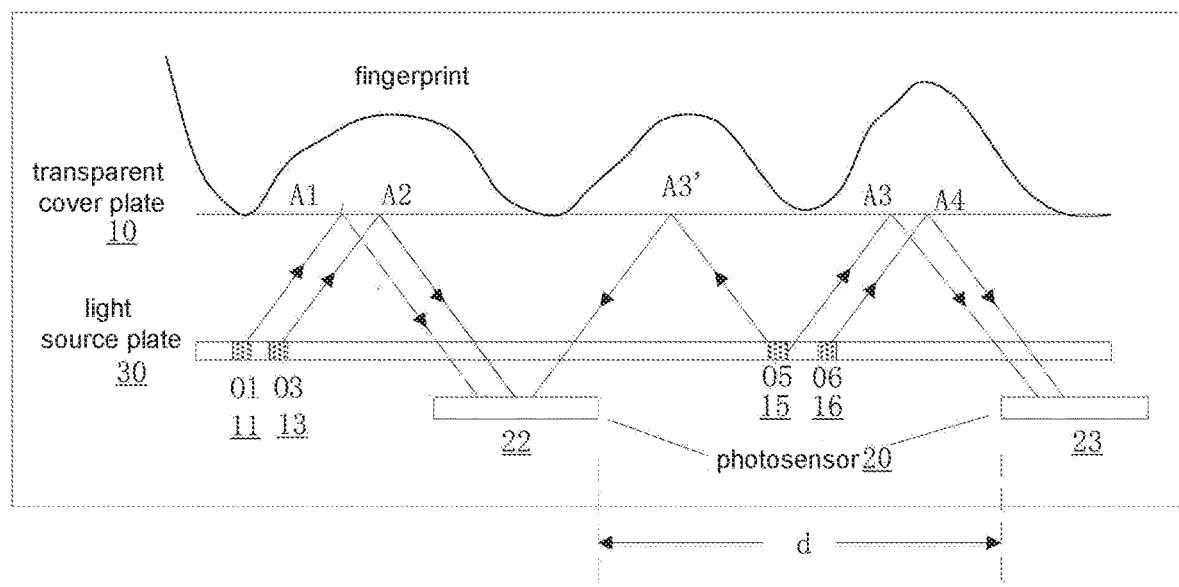
FIG. 5 is a schematic diagram of imaging of an image capturing device under a screen according to another embodiment of the present invention.

As shown in FIG. 5, a fifth light source 15 and a sixth light source 16 are further disposed on the light source plate 30, and a third sensor 23 is further disposed below the light source plate 30. The fifth light source 15 is O5 and the sixth light source 16 is O6 in FIG. 5. The light emitted by O5 and passing through the optical path O5A3' is received by the second sensor 22 after being reflected, and the light emitted by O5 and passing through the optical path O5A3 is received by the third sensor 23 after being reflected. The light emitted by O6 and passing through the optical path O6A4 is received by the third sensor 23 after being reflected. It should be noted that FIG. 5 is only a schematic diagram of an optical path for obtaining certain fingerprint information. In specific application scenarios, the number of the light sources and sensors may be varied, as long as the light emitted by each light source can be totally reflected on the surface of the nonopaque cover plate 10 and received by a certain photosensor 20 below the light source board 30 after being totally reflected. In the embodiment, each discrete photosensor is located directly below the gap between adjacent light sources of the plurality of light sources arranged in the array, that is, the light sources and the sensors are staggered, so that the gap between the light sources can be fully utilized, and the utilization of the space under the screen is improved.

An image capturing device under the screen is provided in the present disclosure. The image capturing device under the screen includes a nonopaque cover plate, a light source module (ie, the light source plate 30), and a photosensor module. The nonopaque cover plate, the light source module, and the photosensor module are sequentially arranged from top to bottom. The nonopaque cover plate is provided with nonopaque area, the light source module includes a plurality of light sources arranged in an array, and the photosensor module includes a plurality of discrete photosensors. The light emitted from each light source toward the nonopaque area is reflected by the nonopaque cover plate and received by one photosensor in the photosensor module. Because the multiple photosensors are arranged separately, compared with the photosensor that is provided under the screen and has a large area for receiving the reflected light, the overall area of the photosensor is effectively reduced and the cost of hardware are saved.

In addition, the plurality of discrete photosensors are respectively located directly below the plurality of light sources arranged in the array. The arrangement can make the distribution of the photoelectric sensor and the light source under the screen more reasonable, and reduce the occupation of space under the screen as much as possible.

In some embodiments, the light received by the photosensor includes the light emitted from at least one of light sources, directed to the nonopaque area, totally reflected by the nonopaque cover plate and entering the photo sensor. The gap between adjacent ones of the plurality of discrete photosensors is smaller than the propagation distance of the totally reflected light in the direction parallel to the surface of the nonopaque cover plate.

An electronic equipment including a processor and an image capturing device connected to the processor is provided in the present disclosure. The image capturing device is an image capturing device under the screen as shown in FIG. 2, FIG. 4 or FIG. 5.

An image capturing device under the screen which includes the nonopaque cover plate 10, a group of light sources and a group of photosensors 20 is also provided in the present disclosure. The nonopaque cover plate 10, the group of light sources and the group of photosensors 20 are sequentially arranged from top to bottom. The nonopaque cover plate 10 is provided with a nonopaque area. The group of the photosensors 20 includes a plurality of photo-sensors arranged in an array. There is a gap between each photosensor 20. The light source group includes a plurality of light sources arranged in an array. The projection of the photosensor 20 in any horizontal direction is longer than the light source. The light emitted from each light source toward the nonopaque area is totally reflected by the nonopaque cover plate 10 and received by one of the group of the photosensors 20. The description about the size of the photosensor 20 being larger than the light source has been described in detail in the foregoing and is not repeated again. The main difference between this embodiment and the aforementioned one is that there are multiple light sources that are lit in a time sequence, so that a fingerprint image of a nonopaque area in a wide range can be obtained.

Although the above embodiments have been described, those skilled in the art can make other changes and modifications to these embodiments once they have learned the basic inventive concept. Therefore, the above descriptions are only the embodiments of the present invention, and thus does not limit the patent protective scope of the present invention. Similarly, any equivalent structure or equivalent process transformation made by using the present specification and the drawings, or directly or indirectly applied to other relevant technical fields, shall be included in the patent protective scope of the present invention.

What is claimed is:

1. An image capturing device under a screen, comprising: a nonopaque cover plate, a light source module, and a photosensor module, wherein the nonopaque cover plate, the light source module, and the photosensor module are sequentially arranged from top to bottom, the nonopaque cover plate is provided with a nonopaque area, the light source module comprises a plurality of light sources arranged in an array, the photosensor module comprises a plurality of discrete photosensors, the light emitted from each light source toward the nonopaque area is reflected by the nonopaque cover plate and received by one photosensor in the photosensor module;

wherein the light source module comprises a first light source, the photosensor module comprises a second sensor, and there is not a normal line of the nonopaque cover plate passing through the first light source and the second sensor simultaneously;

the light emitted by the first light source toward the nonopaque area is totally reflected to the second sensor by the nonopaque cover plate;

wherein the light source module further comprises a third light source, the first light source and the third light source are lit according to a preset time sequence, and there is not a normal line of the nonopaque cover plate passing through the third light source and the second sensor simultaneously;

light emitted from the third light source toward the nonopaque area is totally reflected to the second sensor by the nonopaque cover plate.

2. The image capturing device under the screen according to claim 1, wherein the plurality of discrete photosensors are respectively located directly below the plurality of light sources arranged in the array.

3. The image capturing device under the screen according to claim 2, wherein the light received by the photosensor comprises the light emitted from at least one of the plurality of light sources, directed to the nonopaque area, totally reflected by the nonopaque cover plate and entering the photosensor, a gap between adjacent photosensors of the plurality of discrete photosensors is smaller than a propagation distance of the totally reflected light in a direction parallel to a surface of the nonopaque cover plate.

4. The image capturing device under the screen according to claim 1, wherein the photosensor module comprises a first photosensor, a normal line of the nonopaque cover plate passes through the first sensor and the first light source, and another normal line of the nonopaque cover plate passes through the first sensor and the third light source.

5. The image capturing device under the screen according to claim 4, wherein the light source module further comprises a second light source, a normal line of the nonopaque cover plate passes through the second sensor and the second light source, light emitted from the second light source toward the nonopaque area is totally reflected to the first sensor by the nonopaque cover plate.

6. The image capturing device under the screen according to claim 5, wherein the light source module further comprises a fourth light source, one normal line of the nonopaque cover plate passes through the second sensor and the fourth light source, light emitted from the fourth light source toward the nonopaque area is totally reflected to the first sensor by the nonopaque cover plate;

the second light source and the fourth light source are lit according to a preset time sequence.

7. The image capturing device under the screen according to claim 1, wherein the plurality of discrete photosensors are respectively located directly below gaps between adjacent light sources of the plurality of light sources arranged in the array.

8. The image capturing device under the screen according to claim 1, wherein the light source module comprises a display panel, and the display panel is a liquid crystal display, a organic light emitting diode display, or a micro light emitting diode display;

the plurality of light sources are a plurality of display pixels on the display panel.

9. An electronic equipment comprising a processor and an image capturing device according to claim 1, wherein the image capturing device is communicated with the processor.

* * * * *